(No Model.)
G. L. CRANDAL.
MEANS FOR PROTECTING BUTTON HOLES.
No. 294,446.        Patented Mar. 4, 1884.
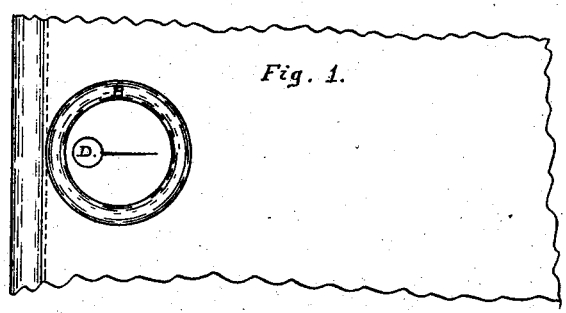
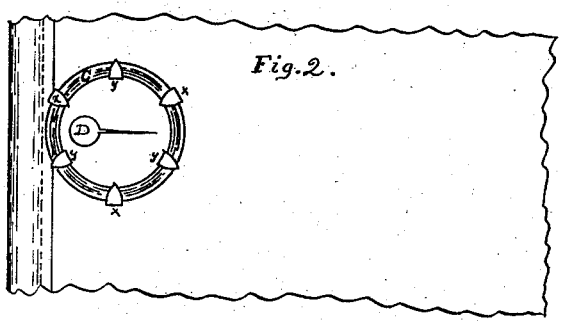
Witnesses:        Inventor:
C. M. Underwood        Geo L. Crandal
B. T. Lacey.        By Chas. M. Stone, atty.

UNITED STATES PATENT OFFICE.

GEORGE L. CRANDAL, OF BINGHAMTON, NEW YORK.

MEANS FOR PROTECTING BUTTON-HOLES.

SPECIFICATION forming part of Letters Patent No. 291,446, dated March 4, 1884.

Application filed December 17, 1883. (No model.)

*To all whom it may concern:*

Be it known that I, GEORGE L. CRANDAL, a citizen of the United States, residing at Binghamton, in the county of Broome and State of New York, have invented a new and useful Means for Protecting Button-Holes, of which the following is a specification.

Previous to the year 1872 no button-hole protectors were made which did not require a portion of the fabric to be cut away before they could be inserted. A hole had to be made large enough for the application of metal rings, which also held in position a false button-hole of some description. On the 3d day of December, 1872, Letters Patent of the United States were granted to John Watters for a "mode of securing button-holes," and the invention therein shown is hereby disclaimed.

The object of my invention is to improve upon the method of attachment shown in said Letters Patent so granted to said John Watters.

In the drawings, Figure 1 shows a front view of my button-hole protector as applied to a carriage-curtain. Fig. 2 represents a rear view of the same.

Fig. 3 represents the front metal ring, B, having three (more or less) teeth or projections, $x$, and three (more or less) teeth or projections, $y$, all being struck out of the same metal with the ring B, and then bent at right angles to the same. The teeth $x$ project from the outside edge, and the teeth $y$ project from the inside edge, of the ring B. Fig. 3 also shows the plain metal back ring, C. After the button-hole D has been made in the carriage-curtain or fabric, a series of small holes corresponding both in position and number with the projections $x$ $y$ are made in the fabric around the button-hole D. The projections $x$ $y$ are inserted through these small holes from the front of the fabric. The plain back ring, C, is next placed between the circular rows of teeth $x$ and $y$, which are then bent over on the ring C. The teeth $x$ $y$ are necessarily bent over in opposite directions on the ring C, and it is evident that in this way the two rings B and C are very securely and firmly held together against the fabric, and any liability of the rings to become loose and work back and forth is prevented.

Letters Patent were granted to me May 4, 1880, reissued April 3, 1883, for a "carriage-curtain fastener," in which I employ two metal rings with inside and outside clinching-teeth. These rings as they are there shown are claimed in combination with a leather patch, strap, curtain-fastener, or some substance foreign to the fabric itself, and must necessarily be made so as to hold and fasten such foreign substance. In order to accomplish this the outside edge of the outside ring is swaged up higher than the inside edge, so that the foreign substance can lie within the ring and be level with its outside edge.

In my improved button-hole protector no foreign substance is used with the rings, and the outside ring, B, may be made perfectly flat; but it is better to round it over a little in order to give it a finish. The outside ring of John Watters' button-hole protector has teeth on the inside edge only, and must necessarily be applied to the fabric with great care, for the teeth when bent down bear only in one direction against the inside ring, and if the clinching down of the teeth is not properly done the inside ring is liable to work back and forth and become loose. In my invention the double rows of teeth $x$ $y$ being bent in opposite directions over the inside ring, C, hold it much more securely in position and prevent it from working in either direction. In this way, also, the two rings B and C are very firmly held together against the fabric, and protect it and prevent the button-hole from being torn out by use.

In this device, also, it is not necessary to use as heavy metal as is used in other devices.

I claim—

1. In a button-hole protector, the combination, with the ring C, of the ring B, made with three (more or less) teeth or projections, $x$, on the outside edge, and three (more or less) teeth or projections, $y$, on the inside edge, substantially as described.

2. In a button-hole protector, the combination, with the two rings B and C and teeth $x$ $y$, of a carriage-curtain or other fabric having made therein a button-hole, said button-hole being surrounded and protected by said rings B and C, and the teeth $x$ $y$, after passing through the fabric, being clinched down from opposite directions on the ring C, substantially as described.

Witnesses:     GEO. L. CRANDAL.
E. H. TITCHENER,
N. H. SHORT.